May 29, 1915.

DRAWING

321

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK.

UNITED STATES PATENT OFFICE.

ELI CODDINGTON, OF THOMPSON, NEW YORK.

MACHINE FOR TURNING MOLDING AND BEADS.

Specification of Letters Patent No. 321, dated July 31, 1837.

*To all whom it may concern:*

Be it known that I, ELI CODDINGTON, of Thompson, in the county of Sullivan and State of New York, have invented an Improvement in Machines Used for Turning, by means of which improvement table and chair legs, fancy brush-handles, and a variety of other articles requiring to have moldings, fillets, beads, hollows, &c., upon them may be turned with great rapidity and precision; and I do hereby declare that the following is a full and exact description thereof.

A slide and guide, are placed upon the lathe, in front of the mandrel, for holding the tools, and advancing them upon the stuff, when necessary, in the operation of turning. The stuff to be turned is fixed in a chuck, in a collar and mandrel lathe, in any of the known ways; one end of it being held in the chuck, and the remainder of it projecting therefrom toward the front of the lathe.

A, A, are the guide checks, fixed upon the lathe in a proper range with the mandrel, and supporting a slide B, B, which passes back and forth upon it, by the aid of tongues and grooves. The outer end of the piece to be turned enters a cylindrical excavation, C, made one half in the cross rail D, and the other half in the hinged piece E, which hinged piece holds a gouge-formed cutter F. The excavation C, is trumpet-mouthed, to admit the end of the unturned stuff. If the hinged piece, E, be held down, the end of the stuff to be turned be made to enter the trumpet-mouthed excavation, and the slide B, B, be forced forward against it, the cutter F, will reduce it to a cylindrical form, and it will pass through the excavation C. The gouge-formed cutter curves up at its outer edge, where the stuff is to be roughed down, but is nearly flat toward its inner edge, where the finishing takes place. Machines very similar to that so far described, are known and used, and I do not, therefore, claim it as constituting any part of my invention; but confine my claim to that which I am about to describe, for turning moldings, beads, &c.

G, G', are a cross rail and hinged piece, similar to those first described, and H, H, are cutters, the cutting edges of which are so formed as to cut beads, hollows, or such other members of moldings as may be required. The piece of stuff, rendered cylindrical by the first cutter, is received into the hollow of the cross rail G, and the hinged piece with its cutters, H, H, are then brought down upon it, so as to form the molding required. When fancy broom handles, or other articles, are turned, which are to be cut off to a length, the outermost of the cutters H, H, is so formed as to effect this object, and to give a rounding, or any other desired shape to the termination.

I, is a screw which passes through the end of the hinged piece G', its lower end being tapped into the slide, and serving, when turned, to bring the hinged piece G', and its cutters, H, H, regularly down upon the stuff. This may also be effected by means of a lever, a cam, or other contrivance. It may sometimes be found advantageous to have a weighted lever upon the slide, close to the cross bar G, to hold the stuff in its place on the bar, preparatory to the bringing the molding cutters down upon it.

What I claim as my invention, and wish to secure by Letters Patent, is—

The general arrangement of that part of the above described machine by which the cutting of beads, hollows, or other members of moldings is effected, by bringing the molding cutters down upon the stuff, substantially in the way set forth.

ELI CODDINGTON.

Witnesses:
THOS. P. JONES,
GEORGE HOWARD.